April 10, 1951     I. A. MARCHANT ET AL     2,548,487

POLLENIZING DEVICE

Filed April 27, 1946

Ira A. Marchant
Edwin P. Johnson
INVENTORS

BY *Glenn L. Fish*

ATTORNEY

Patented Apr. 10, 1951

2,548,487

UNITED STATES PATENT OFFICE 2,548,487

POLLENIZING DEVICE

Ira A. Marchant and Edwin P. Johnson,
Oroville, Wash.

Application April 27, 1946, Serial No. 665,602

2 Claims. (Cl. 47—1)

This invention relates to a pollenizing device. Blossoms of fruit trees are fertilized by bees and other insects carrying pollen from one flower to another and it frequently happens that many of the flowers will not be pollenized or it is sometimes desired to obtain cross pollenization and this is done by manually applying pollen obtained from a selected tree to blossoms of another tree. This is tedious work and takes a long time to perform.

It is therefore one object of the invention to provide a device by use of which pollen collected from the blossoms of a selected tree may be deposited upon the blossoms of another tree very easily and very quickly.

Another object of the invention is to provide a device by means of which the pollen may be discharged as a spray by air and allowed to settle upon the blossoms to be fertilized.

Another object of the invention is to provide a device of this character wherein a tube is mounted upon a pole of such length that the operator may stand upon the ground under a tree and by raising the pole discharge pollen at a distance above him and thus pollenize blossoms without climbing the tree.

Another object of the invention is to provide a pollenizing device wherein the pollen to be distributed is placed in a container supported in such position that when air is forced through the tube the pollen will be drawn into the tube and discharged from the front end thereof.

Another object of the invention is to provide a pollenizing device having a tube through which air under pressure may pass from a hand actuated bulb or from a valve-controlled pipe or hose leading from a source of compressed air.

The invention is illustrated in the accompanying drawings wherein.

Figure 1:
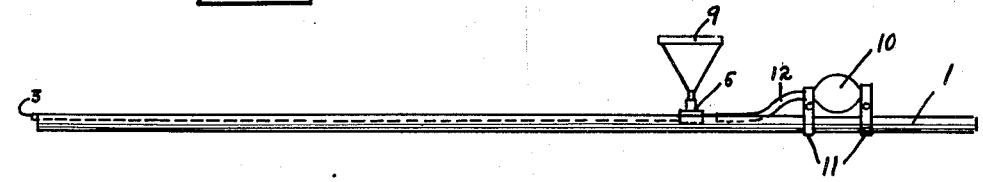
Fig. 1 is a side view of the improved pollenizing device.

This pollenizing device is used for spraying pollen upon the blossoms of fruit trees and in order that an operator may stand upon the ground and discharge pollen upon blossoms of upper branches of a tree there has been provided a pole 1 which may be of any desired length and is formed with a longitudinally extending groove 2 extending from its upper or front end for the major portion of its length, the groove terminating in spaced relation to the rear end of the pole so that this portion of the pole may be used as a handle and conveniently grasped when using the device. A tube or pipe 3 extends longitudinally in the groove and has a rear section 4 which is connected with its main section by a T-coupling 5 having its side arm 6 projecting from the groove and constituting means for connecting a container 7 with the coupling. This container which holds pollen to be sprayed from the tube may be formed of metal or other suitable material and is funnel shaped and provided at its lower end with a neck 8 which is threaded or otherwise detachably mounted in the neck 6. A removable cap or cover 9 is screwed upon the open upper end of the container and is applied after pollen has been poured into the container to close the upper end of the container and prevent pollen from being slipped from the container or blown out of the same during use of the device.

In order to discharge pollen from the tube or pipe 3 there has been provided a bulb 10 which is secured against the pole rearwardly of the groove 2 by clamps 11. This bulb has conventional inlet and outlet valves at its rear and front ends so that when pressure is applied to the bulb air will be forced from its front end and air drawn into the bulb through its rear end when pressure upon the bulb is released. Air forced from the bulb flows through a rubber hose 12 which has its front end connected with the rear end of the pipe section 4 and as the air under pressure flows forwardly through the coupling 5 and the tube or pipe 3 it will draw pollen into the coupling from the container and carry the pollen forwardly with it and the pollen will be discharged in a spray or cloud from the front end of the pipe and settle upon blossoms to be pollenized.

Figure 2:
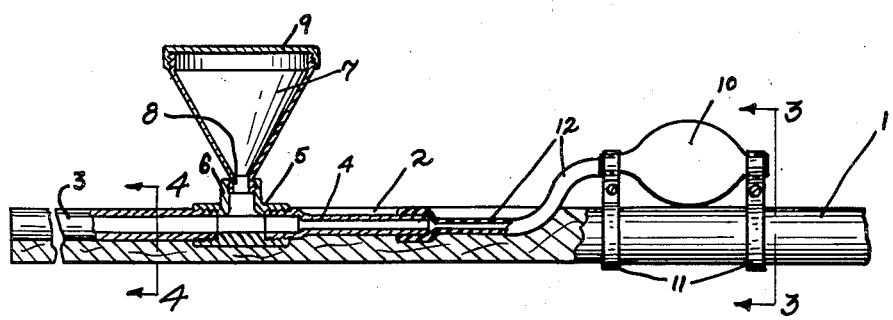
Fig. 2 is a fragmentary view upon an enlarged scale showing the pollenizing device partially in elevation and partially in longitudinal section.
Figure 3:
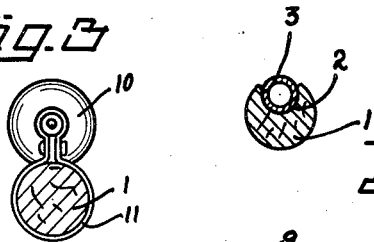
Fig. 3 is a transverse sectional view taken along line 3—3 of Figure 2.
Figure 4:
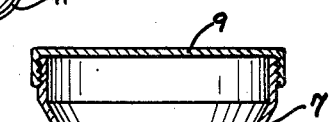
Fig. 4 is a sectional view taken along line 4—4 of Figure 2.
Figure 5:
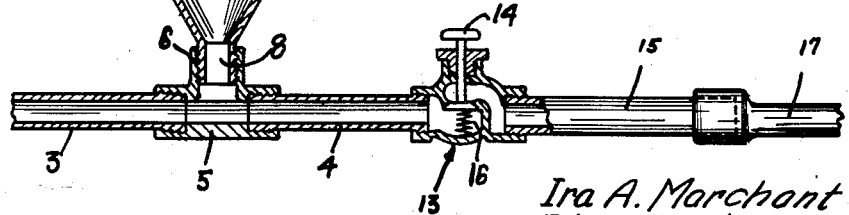
Fig. 5 is a view showing a modified form of pollenizing device in longitudinal section.

Instead of using a pole and a bulb, as shown in Figures 1 and 2, the pole may be eliminated, as shown in Figure 5, and a valve 13 opened by a push button 14 applied to the rear end of the pipe section 4. This valve has a short pipe section 15 screwed into its rear end and is of such length that it may be conveniently grasped and pressure applied to the button 14 to force the valve open and compress the spring 16 which normally holds the valve closed. A rubber hose 17 is connected with the rear end of the pipe section 15 for delivering air under pressure from a tank or other suitable source of compressed air. If so desired the hose may be directly connected with the rear end of the valve 13 instead of providing the pipe 15.

Having described the invention, what is claimed is:

1. A pollenizing device comprising a pole formed with a longitudinally extending groove, a tube extending longitudinally in the groove, a coupling intermediate the length of said tube having an upstanding arm, a container tapered downwardly and having a neck at its lower end engaged with the arm for delivering powder into the tube, a removable cap for said container, a hose extending longitudinally of the pole and having its front end attached to the rear end of the tube, a bulb at the rear end of said hose, and clamps about the pole holding the bulb against the pole.

2. A pollenizing device comprising a pole formed with a longitudinally extending groove, a tube extending longitudinally in said groove, a coupling intermediate the length of said tube having a laterally projecting arm, a container having an outlet neck connected with said arm for delivering powder into said tube, a hose extending longitudinally of said pole back of the tube and having its front end connected with the rear end of the tube, a bulb at the rear end of said hose, and clamps about said pole holding the bulb against the pole.

IRA A. MARCHANT.
EDWIN P. JOHNSON.

REFERENCES CITED

The following references are of record in the file of this patent:

UNITED STATES PATENTS

| Number | Name | Date |
|---|---|---|
| 32,720 | Russell | July 2, 1861 |
| 44,341 | Reynard | Sept. 20, 1864 |
| 600,547 | Mazzanovich | Mar. 15, 1898 |
| 645,028 | Barber | Mar. 6, 1900 |
| 1,528,664 | Ferraguti | Mar. 3, 1925 |
| 1,558,439 | Schilpin | Oct. 20, 1935 |

FOREIGN PATENTS

| Number | Country | Date |
|---|---|---|
| 24,848 | Great Britain | 1913 |

OTHER REFERENCES

International Sugar Journal, vol. 22 (1920), p. 310.